Sept. 11, 1951     U. KRABBE ET AL     2,567,383
MEANS FOR GENERATING LOW-FREQUENCY
ELECTRICAL OSCILLATIONS Filed Nov. 26, 1946     2 Sheets-Sheet 1

Inventors
Ulrik Krabbe
and Sven-Eric Hedström.
By [signature]
Attorney.

Sept. 11, 1951 U. KRABBE ET AL 2,567,383
MEANS FOR GENERATING LOW-FREQUENCY
ELECTRICAL OSCILLATIONS
Filed Nov. 26, 1946 2 Sheets-Sheet 2
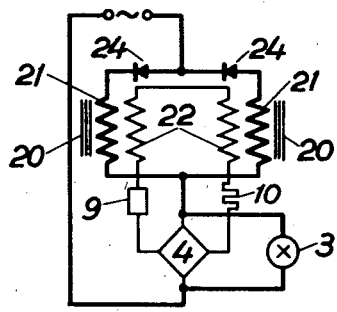
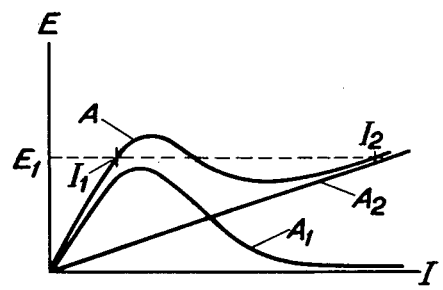
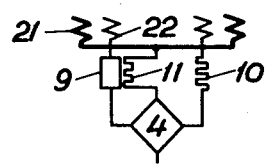
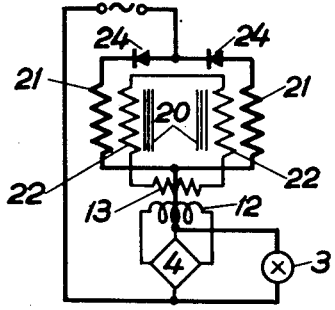
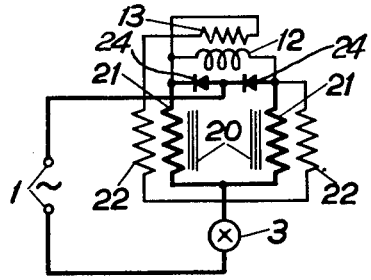
Inventors
Ulrik Krabbe
and Sven-Eric Hedström
By
Attorney.

Patented Sept. 11, 1951

2,567,383

UNITED STATES PATENT OFFICE 2,567,383

MEANS FOR GENERATING LOW-FREQUENCY ELECTRICAL OSCILLATIONS

Ulrik Krabbe, Odense, Denmark, and Sven-Eric Hedström, Ludvika, Sweden, assignors to Allmänna Svenska Elektriska Aktiebolaget Vasteras, Sweden, a corporation of Sweden Application November 26, 1946, Serial No. 712,420
In Sweden March 28, 1946

14 Claims. (Cl. 321—69)

This invention relates to means for generating low frequency electric oscillations, said means being very simple and reliable and therefore particularly suitable for feeding intermittently illuminating appliances for signalling and advertising purposes.

A principal object of the said invention is to provide oscillating means which operate without any movable parts subject to wear and tear and without discharge tubes which have a limited life length and are frequently delicate in handling.

Another important object of the invention is to provide oscillating means which create a comparatively large oscillating power while employing resonance means of much lower power.

For this purpose, the means for generating the low frequency oscillations comprise a direct current saturable reactor, a source of alternating current, a load fed by said source in series with said reactor, means for saturating said reactor with direct current ampere turns substantially equal to the ampere turns of the alternating current traversing said reactor, and means for feeding additional saturating ampere turns to said reactor through a resonance circuit.

Eight different forms of the invention are diagrammatically shown in Figs. 1–5 and 7–9 of the accompanying drawing, while Fig. 6 shows a current-voltage diagram illustrating the operation of Fig. 5.

Figure 1:
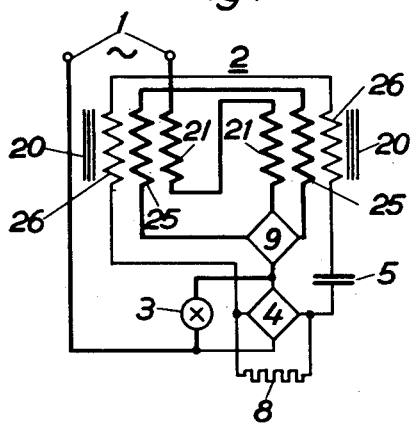

Referring to Fig. 1, the numeral 1 designates the terminals of a source of single phase alternating current, for instance a common distributing line. Between these terminals, there is connected a direct current saturable reactor, generally designated as 2, in series with a load, for instance a lamp 3. The saturable reactor has two separate magnetic cores 20, each carrying three windings 21, 25, 26. The windings on each core should preferably be arranged in a manner known per se so as to reduce the leakage therebetween to a very small value.

The windings 21 are the main windings and carry the alternating current. They are connected in series with one another and with a rectifier 9, between the direct current terminals of which there are connected two direct current saturating windings 25 of the reactor 2, one on each core thereof. The ampere turns of the windings 21 and 25 should preferably be substantially equal. On the alternating current side of the rectifier 9, the circuit further embraces a load 3, for instance an electric lamp intended to give an intermittent light. In parallel to this load there is a full wave rectifier 4, composed for instance of selenium or copper-cuprous oxide discs, the direct current terminals of which rectifier are connected to a third winding 26 of the reactor in series with a condenser 5. In parallel across the direct current terminals of the rectifier 4, there may be connected a resistance 8.

The device as now described operates substantially in the following manner. In the circuit fed by the direct current terminals of the rectifier 4, there will be series resonance between the condenser 5 and the reactance formed by the winding 26, and therefore the current in this circuit will oscillate at a frequency determined by the constants of the circuit, say of the order of magnitude of one per second or what else desired for signalling or advertizing purposes. When the current flows in the direction in which it is not admitted by the rectifier 4, it flows substantially through the resistance 8, which however may be omitted if the rectifier or the condenser is of the type admitting a rather large leakage current. By the amplifying action of the saturable reactor, the oscillation is maintained even though the losses in the oscillating circuit are comparatively high.

Figure 2:
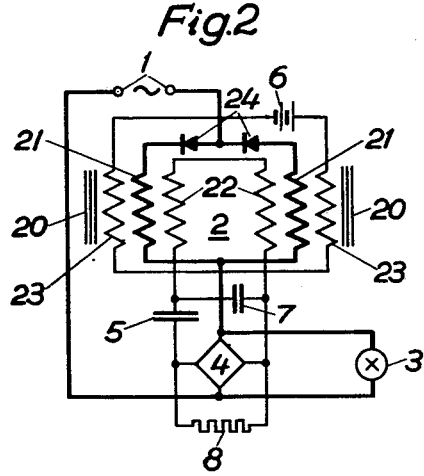

Fig. 2 shows another form of the invention comprising a preferred form of the direct current saturable reactor. In this form, the windings 21 traversed by the alternating current are connected in parallel, and each of them is connected in series with a unidirectional or rectifying valve (also called a half wave rectifier) 24, which may for instance be composed of selenium discs or copper-cuprous oxide discs, admitting current substantially only in one direction. They are so directed as to admit substantially only one half of each alternating current wave through one of the windings 21 and the other half through the other winding 21, the result being that a pulsating direct current circulates through the closed circuit formed by the two parallel windings and the rectifying valves, while the two halves of the alternating current combine again to form a complete alternating current through the external circuit. A reactor composed in this way has the property common with that shown in Fig. 1 of being very sensitive to additional ampere turns acting on the cores thereof, especially if these ampere turns act in the same sense as the circulating direct current, so that a small alteration of the said additional ampere turns causes a large alteration of the alternating current traversing the reactor and the load.

For providing such additional ampere turns, each of the cores 20 has two additional windings 22, 23. The windings 22 are connected in series and fed through a condenser 5 from a full wave rectifier 4 connected in parallel to the load 3. The windings 23, which in many cases may be omitted, are fed from an adjustable source of direct current 6. A condenser 7, preferably of smaller capacity than the condenser 5, may be connected in parallel to the windings 22, and a resistance 8 may be connected between the direct current terminals of the rectifier 4. The said resistance 8 may be of the type the current through which varies more rapidly than the voltage, for instance it may consist of a silicon carbide disc or of a glow discharge lamp.

The device shown in Fig. 1 or 2 operates in the following manner. The windings 26 in Fig. 1 or windings 22 in Fig. 2, respectively, which have a large number of turns and which need only saturate the cores 20 up to the knee of the saturation curve, represent a rather high inductance although a small power. The condenser 5 need therefore only be of moderate capacity, say of the order of magnitude of 10 microfarads, in order to be in resonance with the windings 22 at a frequency of the order of magnitude of 1 oscillation per second. Such an oscillation is therefore created in the circuit containing the windings 22 and condenser 5 and fed from the direct current terminals of the rectifier 4. The half waves of this oscillation which are not admitted by the rectifier traverse the resistance 8, and if this resistance is of the aforesaid type in which the current varies more rapidly than the voltage, the curve of the oscillating current will approach more or less the rectangular shape rather than the sinusoidal one. This oscillating current of a rather small power in the circuit comprising the windings 22 and condenser 5 will be accompanied by an oscillating current of much higher power in the circuit containing the windings 21 and the load 3, as each half wave of the current in windings 22 of Fig. 2 or in the windings 21 and 25 together in Fig. 1 saturates the core 20 up to the knee so that the corresponding winding 21 offers very little inductance to the current wave traversing it. The current in the winding 21, and thus also through the load 3, will therefore oscillate at a low frequency between a maximum value and practically zero. If the load is a lamp as shown, it will therefore give an intermittent light oscillating at the said low frequency.

Figure 3:
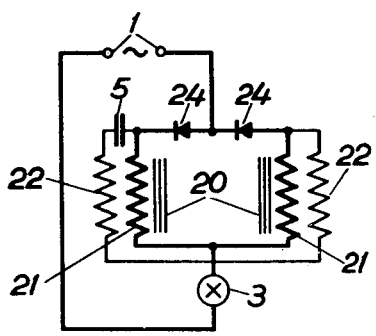

Fig. 3 shows a form which is based on the same general principle as that of Fig. 2 but constitutes a substantial simplification thereof. The main winding 21 of the direct current saturable reactor 2 fed from the alternating current terminals, has two halves connected in parallel for the alternating current, and each of them is connected in series with a half wave rectifier 24, causing a pulsating direct current to circulate through the winding 21, as in Fig. 2. The winding 22 forming part of the oscillating circuit is simply connected in parallel to the winding 21 across a condenser 5. The ohmic drop caused by the circulating direct current in the winding 21 is sufficient to serve as a direct current voltage source for the winding 22, and an oscillating current of low frequency is superimposed thereupon by means of the condenser 5. When the ampere turns of the winding 22 oppose the direct current ampere turns of the winding 21, the current in the latter winding, and thus also the load current, will have nearly zero value, and when the ampere turns of the two windings cooperate, the load current will have a maximum value. The oscillating power in the winding 22 will represent only a small fraction of the total oscillating power.

Figure 4:
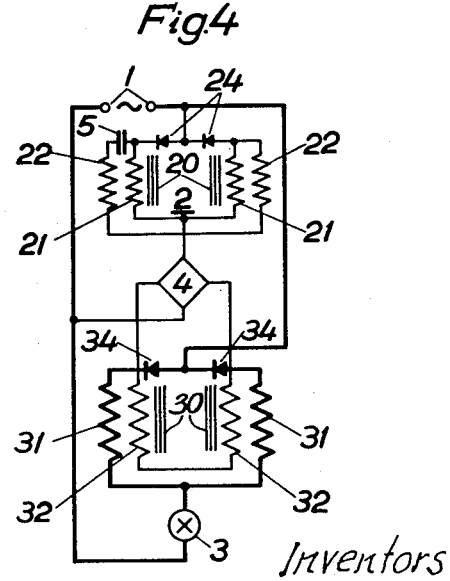

A still higher value of the load power as compared with the power in the resonance circuit may be obtained by the connection shown in Fig. 4. In this figure, the upper part exactly corresponds to the saturable reactor shown in Fig. 3, having alternating current terminals 1, two cores 20, a main winding 21 with two half wave rectifier elements 24, and an oscillating winding 22 connected in series with a condenser 5. The alternating current traversing the winding 21 does not, however, directly traverse the load, as in Fig. 3, but is rectified in a separate rectifier 4, and the direct current obtained thereby acts to saturate an amplifying reactor having two cores 30, two main winding halves 31 connected in parallel for the alternating current supplied from the terminals 1 and in series with half wave rectifier elements 34 to form a closed direct current circuit and two series connected winding halves 32 fed from the direct current terminals of the rectifier 4. The alternating current traversing the winding 31 also traverses the load 3 and varies with the oscillating current derived from the reactor 2.

In Fig. 5, the direct current saturable reactor 2 is also of the same type as in Fig. 2, having two cores 20, two main windings 21 connected in parallel and having two unidirectional current valves or half wave rectifiers 24 incorporated in their closed circuit, and two resonance saturating windings 22 connected in series. The elements forming resonance with said windings consist in Fig. 5 of two resistances 9, 10 connected in series with one another and with the windings 22 in a circuit fed by the direct current terminals of the rectifier 4 connected in parallel to the load 3. One of said resistances 9 is of the thermo-negative type, that is, in which the ohmic value is considerably lowered when the temperature is raised and has only a small fraction of its original value when glow temperature is reached. Uranium dioxide forms an example of materials suitable for such resistances. Their current-voltage characteristic is of the type represented by the curve $A_1$ in Fig. 6. The other resistance 10 connected in series therewith has a substantially constant ohmic value, represented by the straight line $A_2$ in Fig. 6. The two resistances together will therefore be represented by the current-voltage characteristic A in Fig. 6. If the mean direct current voltage furnished by the rectifier 4 lies between the maximum and minimum values of the said curve A, for instance has the value $E_1$, the current will fluctuate between the two values $I_1$ and $I_2$ at a rate depending on the thermic time constant of the resistance 9 and on the magnetic time constant of the winding 22. The ampere turns of the winding 22 oppose the self-magnetisation of the reactor furnished by the valves 24, and therefore a rise of the current in 22 from $I_1$ to $I_2$ will be accompanied by a sinking of the current in the winding 21 and of the load current, and an oscillation of these currents will follow.

Instead of heating the resistance 9 only by the current traversing it, it may be indirectly heated by the load current by causing said current to traverse a separate resistance 11 adjacent to the resistance 9, as shown in Fig. 7, in which only the resistances 9, 10, 11 and their neighbor parts are represented.

Fig. 8 shows a connection, in which the condenser 5 of Fig. 2 is replaced by an inductive connection. In parallel to the rectifier 4 on the direct current side, there is connected a reactor 12, preferably with an iron core having an airgap, and this reactor has a secondary winding 13 which feeds the winding 22 and is so connected, that a rising load current will cause a current in the winding 22 which opposes said rising. By reason of the magnetic inertia in the reactor 12, this will cause oscillating currents in the winding 22 and in the load circuit.

Fig. 9, finally, shows a connection which operates substantially as that of Fig. 8, but which differs from Fig. 8 in the same manner as Fig. 3 differs from Fig. 2. The main winding 21 on the cores 20 of the saturable reactor is thus connected in circuit with half wave rectifier elements 24 as in Fig. 8, but the winding 22 of the oscillating circuit is connected in parallel to the winding 21, as in Fig. 3. In series with the winding 22, there is connected a secondary winding 13 of a reactor having an airgap, the primary winding 12 of said reactor being connected across the winding 21.

In Fig. 9, the reactor winding 12 should have a high ohmic resistance so as to absorb only a small fraction of the direct current circulating in the winding 21. Similarly in Fig. 8, the reactor 12 should absorb only a small fraction of the load current traversing the rectifier 4. The reactor 12 should also have a high reactance so as to permit only a slow increase of the current in the winding 22 under the influence of a substantially constant direct current voltage. When the ampere turns of the current in the winding 22 reach a certain value, opposing the ampere turns of the winding 21, the current in the winding 21 will drop to a low value. With a certain retardation, the current in the winding 22 will then also drop, and hereby an oscillation will be generated in the current through the winding 21 and thus also through the load 3. It will be noted that in every case the direct current saturating ampere turns substantially equal to the number of ampere turns of the alternating current are derived from this alternating current, or, in other words, that the direct current saturable reactor is self-magnetized.

We claim as our invention:

1. Means for generating low frequency oscillations, comprising a direct current saturable reactor, a source of alternating current, a load fed by said source in series with said reactor, means for saturating the reactor with direct current ampere turns including means variable with changes in the alternating current traversing the reactor to vary the number of such saturating ampere turns in direct proportion with variations in such alternating current so as to maintain them substantially equal to the ampere turns of such alternating current, and means for feeding additional saturating ampere turns to said reactor, said last means including a resonance circuit containing elements capable of independent oscillation, and means to supply current to such circuit.

2. Means for generating low frequency oscillations, comprising a direct current saturable reactor, a source of alternating current, a load fed by said source in series with said reactor, means for saturating the reactor with direct current ampere turns including means variable with changes in the alternating current traversing the reactor to vary the number of such saturating ampere turns in direct proportion with variations in such alternating current so as to maintain them substantially equal to the ampere turns of such alternating current, an additional winding on said reactor, and means to supply to such winding a current alternately reinforcing and opposing said saturating direct current ampere turns at a rate considerably lower than the frequency of said alternating current, said last means including a resonance circuit containing elements capable of independent oscillation, and means to supply current to such circuit.

3. Means for generating low frequency oscillations, comprising a direct current saturable reactor, a source of alternating current, a load fed by said source in series with said reactor, means for saturating the reactor with direct current ampere turns including means variable with changes in the alternating current traversing the reactor to vary the number of such saturating ampere turns in direct proportion with variations in such alternating current so as to maintain them substantially equal to the ampere turns of such alternating current, a rectifier having alternating current input and direct current output connected in parallel with said load, a saturating winding on said reactor, and a circuit connected to said winding and fed from said direct current output, said circuit having means therein capable of causing current flow of an oscillatory character.

4. Means for generating low frequency oscillations, comprising a direct current saturable reactor, a source of alternating current, a load fed by said source in series with said reactor, said reactor comprising two parallel units, a rectifying valve in series with each unit adapted to admit one half of each alternating current wave through either unit, thereby saturating the reactor with a number of direct current saturating ampere turns which varies in direct proportion with variations in such alternating current so as to maintain them substantially equal to the ampere turns of such alternating current, an additional winding on each unit of said reactor, and means to supply to each such winding a current alternately reinforcing and opposing said saturating direct current ampere turns at a rate considerably lower than the frequency of said alternating current, said last means including a resonance circuit containing elements capable of independent oscillation, and means to supply current to such circuit.

5. In means as claimed in claim 1, said circuit including a phase displacing means.

6. In means as claimed in claim 1, said circuit including a condenser.

7. In means as claimed in claim 1, said circuit including a thermo-negative resistance in series with a constant resistance.

8. In means as claimed in claim 1, said circuit including a reactor having a secondary winding.

9. Means for generating low frequency oscillations, comprising a direct current saturable reactor, a source of alternating current, a load fed by said source in series with said reactor, said reactor comprising two parallel units, a rectifying valve in series with each unit adapted to admit one half of each alternating current wave through either unit, thereby saturating the reactor with a number of direct current saturating ampere turns which varies in direct proportion with variations in such alternating current so as to maintain them substantially equal to the ampere turns of such alternating current, an additional winding on each unit of said reactor, and means to supply to each such winding a current alternately reinforcing and opposing said saturating direct current ampere turns at a rate considerably lower than the frequency of said alternating current, said last means including a circuit connecting said winding in series with a phase displacing means between the points of connection of the reactor units and the rectifying valves.

10. Means for generating low frequency oscillations, comprising a direct current saturable reactor, a source of alternating current, a load fed by said source in series with said reactor, said reactor comprising two parallel units, a rectifying valve in series with each unit adapted to admit one half of each alternating current wave through either unit, thereby saturating the reactor with a number of direct current saturating ampere turns which varies in direct proportion with variations in such alternating current so as to maintain them substantially equal to the ampere turns of such alternating current, an additional winding on each unit of said reactor, and means to supply to each such winding a current alternately reinforcing and opposing said saturating direct current ampere turns at a rate considerably lower than the frequency of said alternating current, said last means including a circuit connecting said windings in series with a phase displacing means between the points of connection of the reactor units and the rectifying valves.

11. Means for generating low frequency oscillations, comprising a direct current saturable reactor, a source of alternating current, a load fed by said source in series with said reactor, said reactor comprising two parallel units, a rectifying valve in series with each unit adapted to admit one half of each alternating current wave through either unit, thereby saturating the reactor with a number of direct current saturating ampere turns which varies in direct proportion with variations in such alternating current so as to maintain them substantially equal to the ampere turns of such alternating current, an additional winding on each unit of said reactor, and means to supply to each such winding a current alternately reinforcing and opposing said saturating direct current ampere turns at a rate considerably lower than the frequency of said alternating current, said last means including a circuit connecting said windings in series with a condenser between the points of connection of the reactor units and the rectifying valves.

12. Means for generating low frequency oscillations, comprising a direct current saturable reactor, a source of alternating current, a load fed by said source in series with said reactor, said reactor comprising two parallel units, a rectifying valve in series with each unit adapted to admit one half of each alternating current wave through either unit, thereby saturating the reactor with a number of direct current saturating ampere turns which varies in direct proportion with variations in such alternating current so as to maintain them substantially equal to the ampere turns of such alternating current, a current alternately reinforcing and opposing said saturating direct current ampere turns at a rate considerably lower than the frequency of said alternating current, said last means including a second reactor connected in parallel with said first reactor and having a secondary winding feeding said winding of the first reactor.

13. Means for generating low frequency oscillations, comprising a direct current saturable reactor, a source of alternating current, a load fed by said source in series with said reactor, means for saturating the reactor with self-magnetizing direct current ampere turns including means variable with changes in the alternating current traversing the reactor to vary the number of such saturating ampere turns in direct proportion with variations in such alternating current so as to maintain them substantially equal to the ampere turns of such alternating current, and means for feeding additional saturating ampere turns to said reactor, said last means including a resonance circuit containing elements capable of independent oscillation, and means to supply current to such circuit.

14. Means for generating low frequency electric oscillations, comprising a direct current saturable reactor having windings, a source of alternating current, a load, a circuit connecting said alternating current source in series with a winding of said reactor and said load, means to saturate said reactor with a number of direct current saturating ampere turns substantially equal to the ampere turns of the alternating current traversing the reactor including means to furnish to a winding of the reactor a direct current substantially directly proportional to such alternating current, and means to feed to a winding of the reactor other than a beforementioned winding additional saturating ampere turns, said last means including a circuit in which said last winding is connected, said last circuit having elements capable of sustaining oscillations having a period different from the period of oscillation of the alternating current, and means to supply current to said last circuit.

ULRIK KRABBE.
SVEN-ERIC HEDSTRÖM.

REFERENCES CITED

The following references are of record in the file of this patent:

UNITED STATES PATENTS

| Number | Name | Date |
|---|---|---|
| 1,639,695 | Heegner | Aug. 23, 1927 |
| 1,739,579 | Dowling | Dec. 17, 1929 |
| 1,862,211 | Dowling | June 7, 1932 |
| 1,921,789 | Suits | Apr. 3, 1933 |
| 1,946,297 | Suits | Feb. 6, 1934 |
| 2,222,048 | Stevens | Nov. 19, 1940 |
| 2,229,952 | Whiteley | Jan. 28, 1941 |
| 2,247,983 | Barth | July 1, 1941 |

FOREIGN PATENTS

| Number | Country | Date |
|---|---|---|
| 431,460 | Great Britain | Oct. 2, 1933 |